US006332278B1

(12) United States Patent
Bezinge et al.

(10) Patent No.: US 6,332,278 B1
(45) Date of Patent: Dec. 25, 2001

(54) PORTABLE PRECISION ELECTRONIC CALIPER

(75) Inventors: Alex Bezinge, Yens; Jean-Luc Bolli, Geneve, both of (CH)

(73) Assignee: Brown & Sharpe TESA SA, Renens (CH)

( * ) Notice: Subject to any disclaimer, the term of this patent is extended or adjusted under 35 U.S.C. 154(b) by 0 days.

(21) Appl. No.: 09/435,353

(22) Filed: Nov. 8, 1999

Related U.S. Application Data

(63) Continuation-in-part of application No. PCT/CH97/00177, filed on May 9, 1997.

(51) Int. Cl.$^7$ ............................................. G01B 7/02
(52) U.S. Cl. ................................... 33/784; 33/708
(58) Field of Search ........................... 33/708, 783, 784, 33/813, 818, 819, 820, 823, 824, 831; 324/207.11, 207.13, 207.24

(56) References Cited

U.S. PATENT DOCUMENTS

| | | | |
|---|---|---|---|
| 4,226,024 | * 10/1980 | Westerberg et al. | 33/783 |
| 4,612,656 | * 9/1986 | Suzuki et al. | 33/784 |
| 5,029,402 | 7/1991 | Lazecki et al. . | |
| 5,174,041 | 12/1992 | Lorenz . | |
| 5,287,630 | * 2/1994 | Geisler | 33/708 |
| 5,386,642 | * 2/1995 | Spies et al. | 33/708 |
| 5,463,805 | 11/1995 | Mowry et al. . | |
| 5,901,458 | * 5/1999 | Andermo et al. | 324/207.24 |
| 6,205,672 | * 3/2001 | Paulsen et al. | 33/784 |

FOREIGN PATENT DOCUMENTS 0 557 149 A1   8/1993   (EP) .
0 286 820 A1   10/1998  (EP) .

* cited by examiner

*Primary Examiner*—G. Bradley Bennett
(74) *Attorney, Agent, or Firm*—Pillsbury Winthrop LLP

(57) ABSTRACT

Portable precision caliper comprising a slide (2) and a shaft (1) each fitted with a jaw (10, respectively 20). The slide is further equipped with electronic means (11) which enable the distance between the jaws (10, 20) to be displayed on an electronic display (12). The electronic means are powered by a battery (110, 111). The shaft (2) is fitted with a magnetized scale (21) with a period of magnetization $\lambda$. The electronic means (11) include a sensor (112) equipped with an array of magnetoresistive electrodes disposed opposite said scale (21). The resistance values of the magnetoresistive electrodes are a sinusoidal function of the longitudinal position of the sensor (112) along the scale (21). The set of magnetoresistive electrodes includes at least certain sets of magnetoresistive electrodes formed of at least 8 electrodes connected in series, so as to increase the electric resistance of the sets and to reduce the electricity consumption of the whole device.

37 Claims, 5 Drawing Sheets

PORTABLE PRECISION ELECTRONIC CALIPER

This application is a continuation-in-part of application PCT/CH97/00177, filed on May 9, 1997, the contents of which are hereby incorporated by reference.

BACKGROUND OF THE INVENTION

1. Field of the Invention

The present invention relates to a portable precision caliper, or slide gauge, used for measuring linear dimensions. More specifically, the present invention relates to a portable precision caliper of an electronic type.

2. Related Art

Traditional vernier calipers tend to be gradually supplanted by electronic calipers which afford better reading at a competitive price. Most of the electronic calipers commonly used nowadays incorporate capacitive sensors. The variations in capacitance caused between an array of electrodes on the caliper's shaft and an array of electrodes disposed opposite on the caliper's slide are measured so as to supply information depending on the position of the slide along the shaft. This information is displayed on a screen, usually integral with the slide. Circuits of this type are described, for example, in patent application EP96810686 in the name of Brown & Sharpe TESA SA.

The principle of capacitive measuring has established itself on the one hand because it provides excellent resolution and precision, and on the other hand because the electricity consumption of these devices is very low, so that they can be powered by a battery for example. Such sensor calipers of a capacitive type must however be kept clean for them to function properly. They are thus badly suited to functioning in a humid environment or an environment subjected to splashes of lubricant or to dust for example. In such difficult conditions, hand-operated vernier calipers or watch-type calipers are therefore preferred to electronic calipers.

Document EP286820 describes a caliper comprising a scale fitted with magnetized sections. A magnetic reading head is fitted on the slide and records the variations in magnetic field caused by the displacement of the slide. Such a magnetic head is however relatively costly and voluminous, so that it is difficult to integrate it within the reduced volume of a caliper. The accuracy of measurement depends directly on the precision and noise in the magnetic head as well as on the correct positioning of the head in relation to the scale. Furthermore, the resolution afforded by this device is limited.

One object of the present invention is therefore to propose a portable electronic caliper which is improved with respect to the prior art devices. In particular, an object of the present invention is to propose a caliper comprising a sensor with a low sensitivity to dust and lubricants, providing a resolution on the order of a hundredth of millimeter and an accuracy on the order of a few hundredths of millimeter, that is, a performance which is comparable to that afforded by capacitive calipers at similar cost, and with an electricity consumption sufficiently reduced so as to be able to be powered by a simple battery, for example by a lithium battery.

SUMMARY OF THE INVENTION

According to the invention, these objects are attained by means of a portable electronic precision caliper comprising a shaft fitted with a magnetized scale having a period of magnetization $\lambda$, a slide which can be displaced longitudinally along said shaft, the slide and the shaft being each fitted with a jaw, an electronic circuit fitted on said slide and self-powered, said electronic circuit comprising a single sensor, said sensor being equipped with an array of n magnetoresistive electrodes disposed opposite said scale so that the values of the resistances of the magnetoresistive electrodes are a function of their longitudinal position along the scale, n being greater than two, said electronic circuit making it possible to determine, from the values of resistance of the magnetoresistive electrodes, information depending on the gap between said jaws and to display this information on an electronic display.

The caliper's shaft according to the invention is fitted with a magnetized scale having a period of magnetization $\lambda$. The sensor is equipped with an array of magnetoresistive electrodes disposed opposite said scale so that the values of resistance of the magnetoresistive electrodes are a periodic function of the longitudinal position of the sensor along the scale. The number of magnetoresistive electrodes is large, in any case greater than 2. Means make it possible to determine, from the values of resistance of the magnetoresistive electrodes, information depending on the gap between the jaws of the calipers. This information is displayed on an electronic display.

Sensors with magnetoresistive electrodes for measuring linear or angular dimensions are known as such. The resistance of the magnetoresistive electrodes of the known sensors is however too weak for them to be able to be powered by a battery. Use of these sensors with a high electricity consumption in electrically self-powered apparatus, for example in portable precision calipers, has therefore not been contemplated.

Calipers using the properties of magnetoresistive materials have already been described for example in patent documents U.S. Pat. Nos. 5,029,402, 4,226,024 and 5,174,041. These documents describe calipers equipped with two distinct sensors, each comprising one magnetoresistive electrode. The distance between the two sensors is critical and determines the achieved accuracy of measurement. The principle adopted using only two magnetoresistive electrodes does not make possible the construction of precision calipers, that is, of calipers which are able to measure lengths with an accuracy and a resolution less than 0.1 mm. For these reasons, use of these calipers is reserved to specific applications such as for measuring meat pieces of the diameter of tree trunks, for which the required accuracy is not very critical. The teachings of these documents however cannot be transposed to the very different technical domain of precision measuring.

BRIEF DESCRIPTION OF THE DRAWINGS

The invention will be better understood from reading the description given by way of example and illustrated by the following figures:

FIG. 1 shows an exploded view of a portable electronic caliper according to the present invention. The construction of such calipers is known and has been described for example in patent application EP719999 in the name of the applicant, the contents of which are hereby incorporated by reference. This document contains notably a possible and advantageous embodiment of the guiding means of the slide along the shaft as well as of the means for regulating the jaws.

Figure 1:
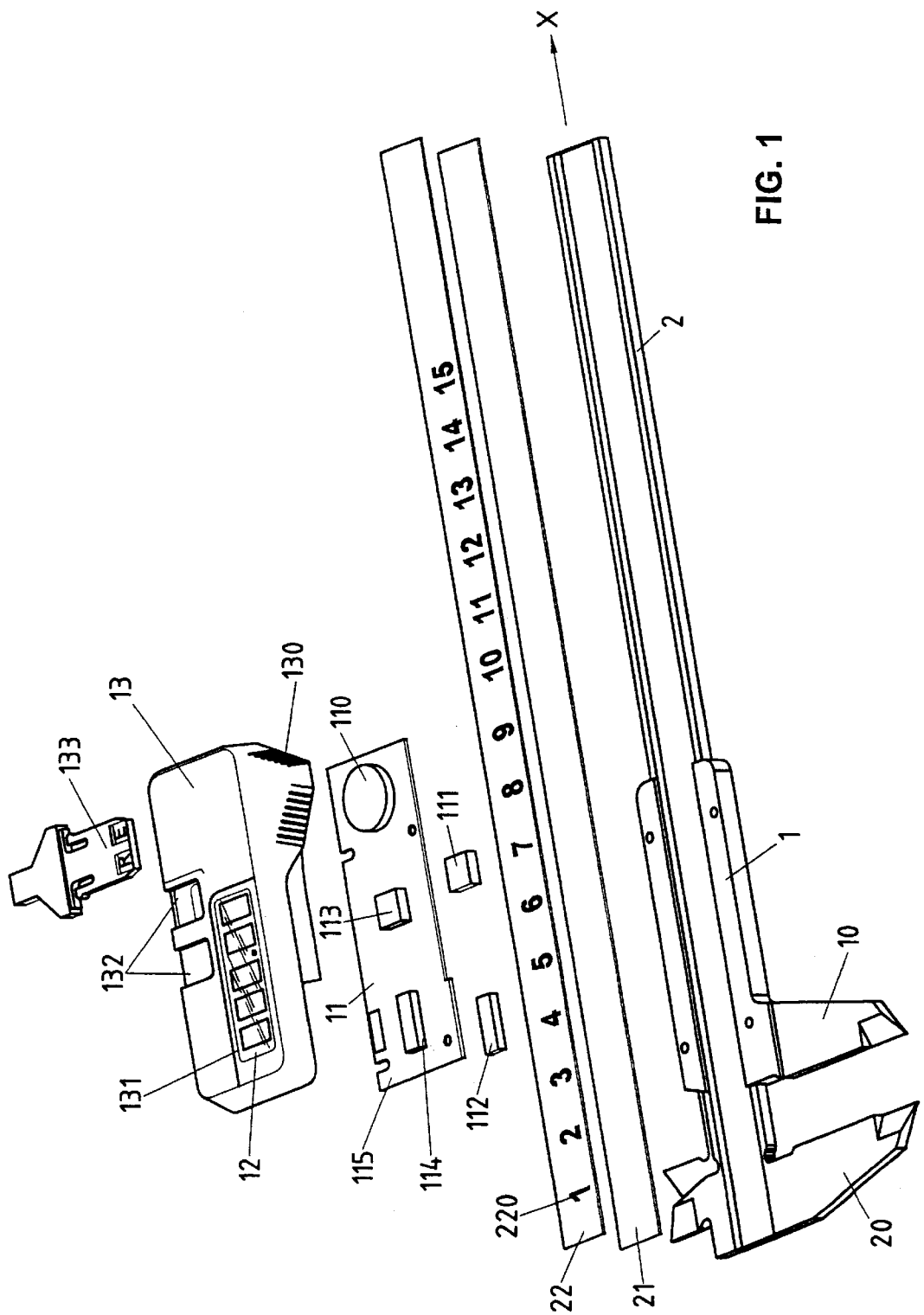
FIG. 1 shows an exploded view of a portable electronic caliper according to the present invention.

The caliper according to a preferred embodiment of the invention comprises a shaft 2 and a slide 1 which can be displaced longitudinally along the shaft. The shaft can have different lengths according to the intended use of the caliper; typical lengths are for instance 15, 20 or 40 centimeters. The slide is fitted with a mobile jaw 10 whereas the shaft is equipped with a fixed jaw 20; a display 12, for instance a liquid crystal display, displays information depending on the gap between the two jaws. For example, the display 12 can indicate with five digits, two of which are after the comma, the distance in millimeters between the two jaws 10 and 20.

A magnetized scale 21 is attached on the shaft by any known fixing means, for example by gluing. The scale extends preferably over the whole length of shaft 2. In an alternative embodiment, the scale extends longitudinally only over the portion of shaft 2 over which sensor 112 (described further below) is able to be displaced.

Figure 2:
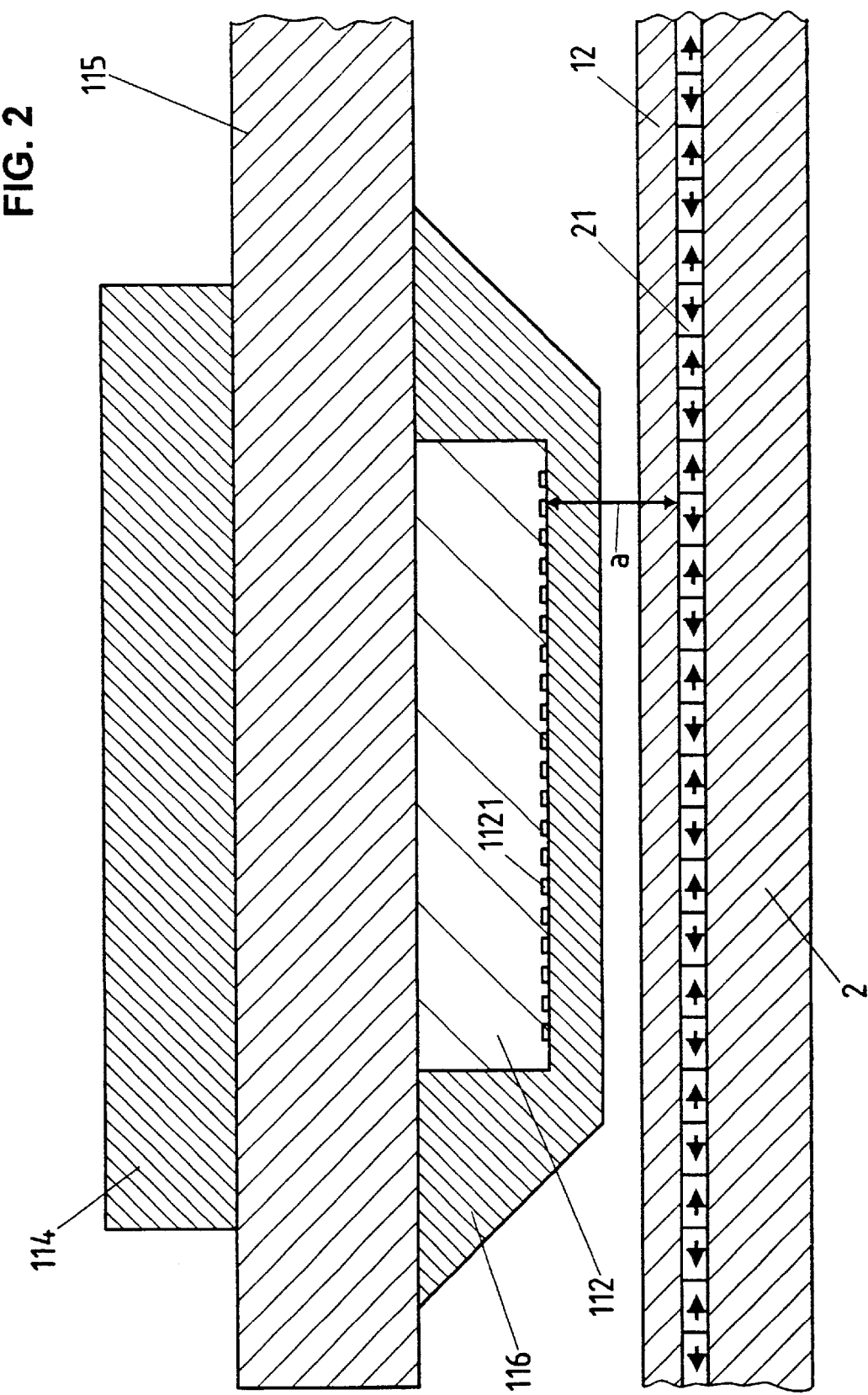
FIG. 2 illustrates an enlarged portion of the electronic means employed in the caliper of the present invention.

Shaft 2 and slide 1 are preferably made of metal, for example of aluminum for an economical execution or of steel for another, sturdier form of execution. Scale 21 is necessarily made of a permanent magnetic material, for example a support of soft steel or glass coated with a layer of ferrite having a high magnetic coercivity. The scale is magnetized with a period of magnetization $\lambda$, as can be seen in particular in FIGS. 2 and 3. In the example illustrated by the figures, the periodic magnetization is essentially horizontal, that is, along the longitudinal axis of scale 21. A scale with a vertical periodic magnetization, that is, perpendicular to the scale's axis, can however also be constructed and offers the advantage of a better stability of the neighboring magnetic domains, being less liable to be displaced by a parasite magnetic field.

It should be noted that, although the shaft and the scale in this preferred embodiment are assembled from two separate pieces, it is also possible to magnetize the shaft directly if it is made of a suitable material, having thus a scale and a shaft integrated within a single element.

Scale 21 is coated with a protective layer of non-magnetic material 22. This protective coating can for example be achieved by means of an auto-adhesive synthetic sheet bearing markings 220 allowing the user to evaluate directly the measurement effected without reading the display 12.

In this example, the slide 1 surrounds the shaft 2 on three sides, namely on the lower and on the lateral sides. A printed circuit board 115 is affixed directly on the top of the slide, preferably with screws. The machining of the slide and of the board 115 is sufficiently precise for the spacing between scale 21 and the printed circuit board 115 to be managed with excellent precision; if necessary, appropriate means can be provided to adjust this distance.

Electronic means, indicated by reference 11, make it possible to display on the electronic liquid crystal display 12 information depending on the gap between the jaws 10 and 20 of the caliper. These electronic means are assembled directly on the printed circuit board 115. They include mainly a single magnetoresistive sensor 112, represented schematically in FIG. 3, assembled under the printed circuit board 115 opposite the magnetized scale 21. Sensor 112 comprises an array of many magnetoresistive electrodes 1121 (FIG. 2) in groups 1120, the value of the different resistances of the array being a periodic function of the position on shaft 2 of slide 1. An epoxy coating 116 protects the magnetoresistive sensor 112 so as to prevent the magnetoresistive paths 1121 from being scratched away by dust particles on the shaft. The means 11 include furthermore self-powered electricity supply means, being a battery 110 in the represented example. Battery 110 is preferably constituted by a flat lithium battery and must warrant a few hours' autonomous functioning of the device. Electricity supply means could also include or be constituted by a photovoltaic cell on the slide's housing. Optionally, the supply means comprise also a linear generator 111 fitted under the printed circuit board 115 and opposite scale 21. The linear generator 111 comprises for example inductive coil type elements. When slide 1 is displaced along the scale, the variable magnetic field across the inductive coil's elements generate a current in these elements which can be used to recharge an accumulator or the rechargeable battery 110. An ASIC type integrated circuit 113 determines, from the values of resistance of the magnetoresistive electrodes on the sensor 112, information depending on the gap between the jaws 10 and 20, and controls the display 12 for displaying this distance. The electronic means 11 preferably also include an optional permanent magnet 114 mounted on the upper side of the printed circuit board 115, opposite sensor 112. Thanks to this permanent magnet, the magnetoresistive electrodes 1121 of sensor 112 can be polarized to give it the required characteristics.

The electronic means 111 are protected by a housing 13, preferably a housing made of a synthetic shockproof material. The shape of the housing is ergonomic and allows for an easy displacement of the slide in both directions: to this effect, housing 13 is fitted with a protuberant nonslip portion 130 thanks to which the slide can be very easily manipulated. An opening 131 through housing 13 makes it possible to see the display 12. Switches 132 command for example the starting of the caliper or other functions such as reset, adding or averaging of successive measurements etc. The housing can be removed or opened at least partially for replacing the battery 110. An optional optoelectronic connector 133 is provided as interface between caliper 1 and external instruments such as printer, personal computer or machine for example.

Figure 3:
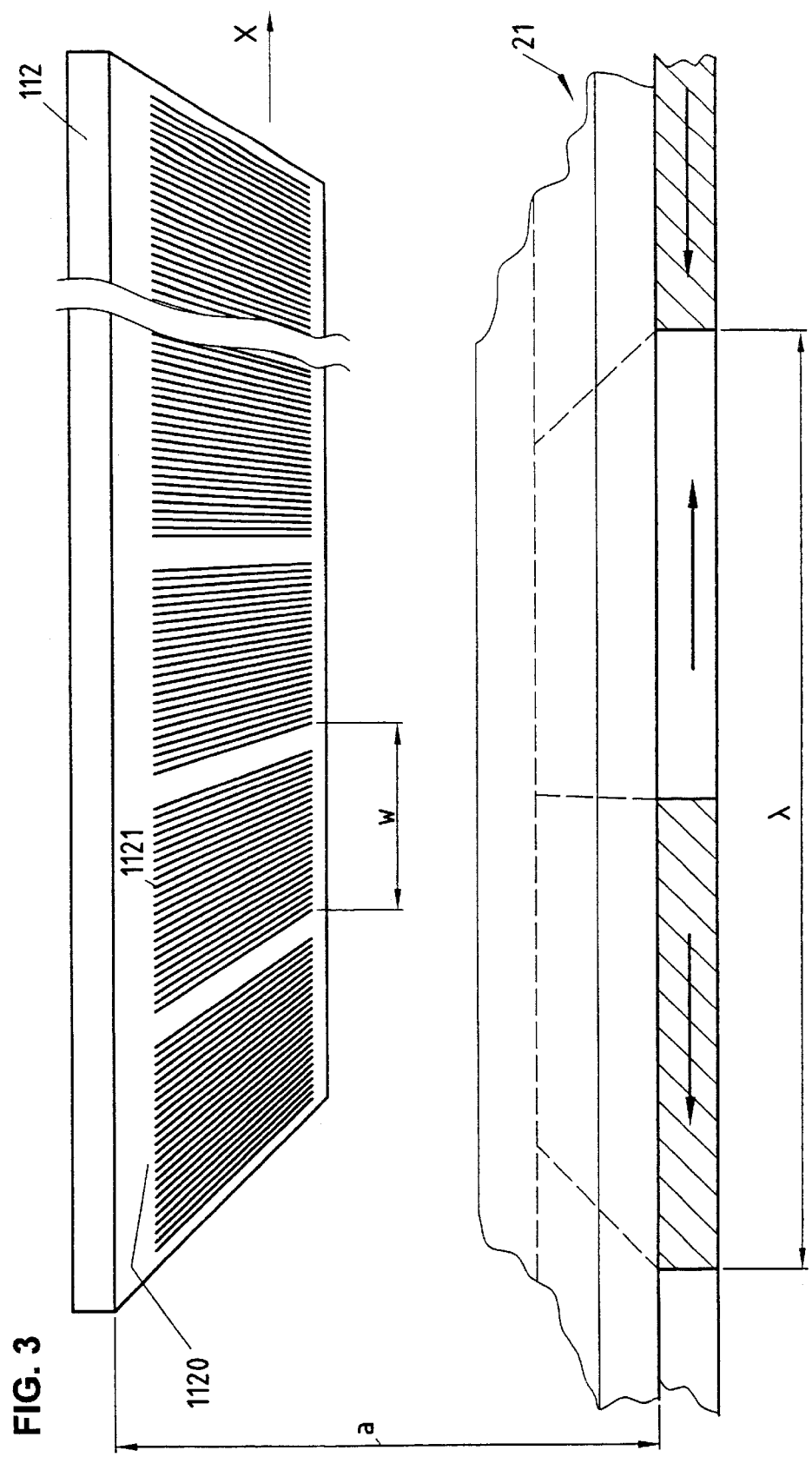
FIG. 3 represents a schematic view in perspective of the magnetoresistive sensor above the scale in a caliper according to the present invention.

The magnetoresistive sensor 112 comprises a large number of magnetoresistive electrodes 1121, visible schematically in FIG. 3. The electrodes 1121 are disposed in an array of parallel electrodes. The length of the electrodes is included in the interval between 0.1 and 10 millimeters and preferably just less than the width of chip 112. For example, if the width of sensor 112 is 1.4 millimeters, the length of the magnetoresistive electrodes will for example be selected close to 1 millimeter. The width of the electrodes is extremely thin, as slim as the current sensor manufacture technology will allow, preferably less than 40 $\mu$m, for example 5 $\mu$m. Their thickness is less than 100 nm, preferably less than 50 nm. With these dimensions it is possible to achieve integrated electrodes having a high resistance and thus to reduce the sensor's electricity consumption way beyond that of the prior art sensors, so that it can be powered by a simple battery 110. These dimensions further make it possible to obtain a sensitivity to the scale's magnetic field that is sufficient for the variations in the electrodes' resistances to be measured without inordinate difficulty by the sensor's electronics.

The various magnetoresistive electrodes 1121 are spread longitudinally on sensor 112 so as to occupy various phase positions with respect to the magnetic field $H_x$ (x) of period λ generated by the scale 2. At a sufficient distance a from scale 2, the magnetic field is an approximately sinusoidal function of x. The magnetic field generated by the scale 21 on each magnetoresistive electrode 1121 is thus a sinusoidal function of the longitudinal position of this electrode; the resistance of each electrode 1121 evolves in a sinusoidal manner when the slide 1 is displaced along the shaft. Circuit 113 determines, from the value of the various resistances 1121, the position of the slide and displays this information on the display 112.

Figure 4:
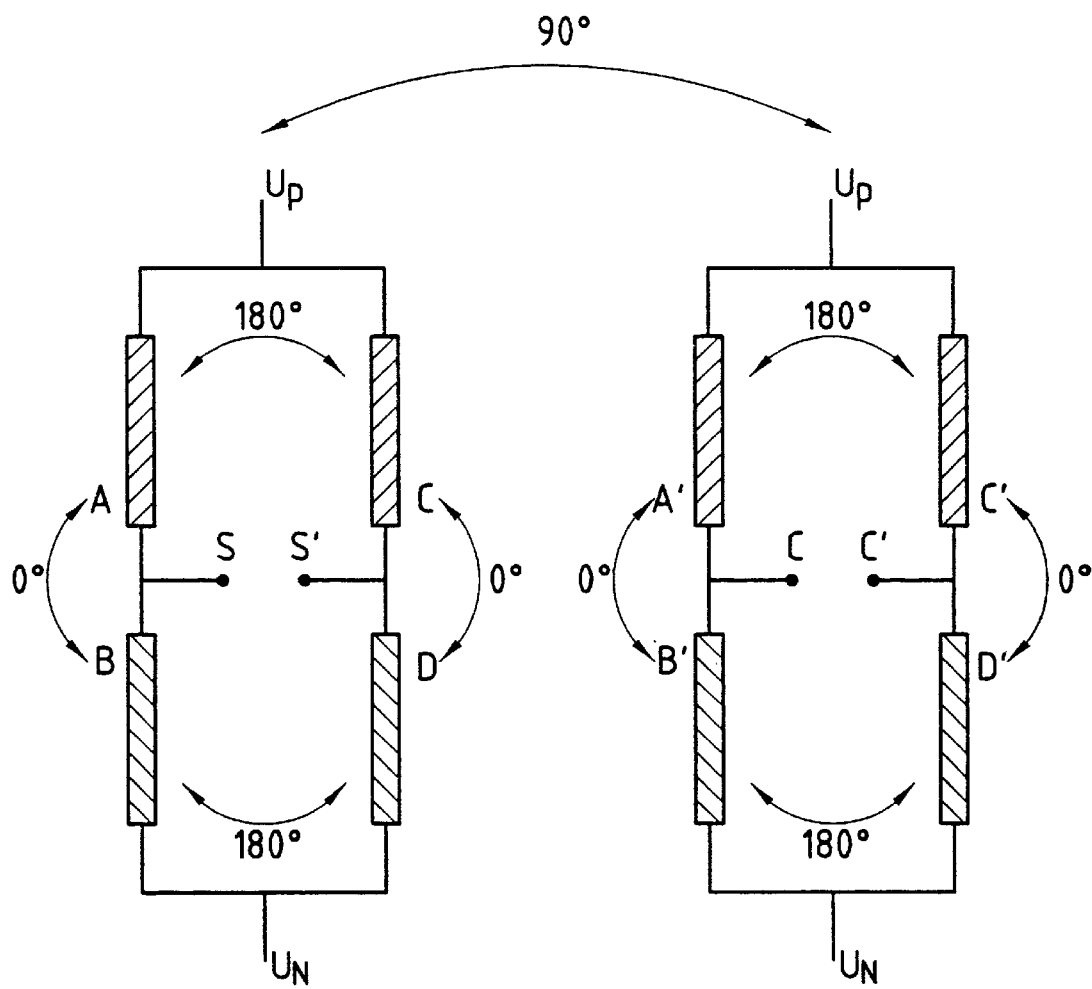
FIG. 4 shows an electric schema illustrating a first example of connection of the magnetoresistive electrodes so as to constitute measuring bridges.

FIG. 4 illustrates schematically a preferred connection mode of the electrodes 1121. The magnetoresistive electrodes are connected in this example so as to define two measuring bridges (Wheatstone bridges). The corresponding electrodes of each bridge are phase-shifted by 90°, that is, by λ/4. Each bridge consists of four magnetoresistive electrodes ABCD, respectively A'B'C'D' (or preferably four sets of magnetoresistive electrodes, as will be shown further below). The electrode or set of electrodes A, respectively A', is phase-shifted by 180° with respect to the electrode or set of electrodes C, respectively C'. Similarly, the electrode or set of electrodes B, respectively B', is phase-shifted by 180° with respect to the electrode or set of electrodes D, respectively D'.

The electrodes A, A', B, B' occupy the same phase positions as the respective electrodes B, B', D, D'. The magnetoresistive electrodes of each pair AB, A'B', CD, C'D' are however provided with a barber-pole structure of opposite orientation, for example at +45° and −45°. It can be shown that an identical magnetic field $H_x$ produces on a magnetoresistive electrode provided with a barber-poles structure oriented at +45° a variation in resistance Δr opposite to that produced on a magnetoresistive electrode provided with a barber-pole structure oriented at −45°. Consequently, providing barber-pole structures of opposite orientation on the magnetoresistive electrodes has the same effect as a phase-shifting by 180°. Using barber-pole structures ensures that the variation in resistance Δr produced on each magnetoresistive electrode 1121 by the field $H_x$ can be controlled. By using barber-pole structures with different orientations, for example structures oriented at + and −45° on the same sensor, one achieves additional freedom for arranging the electrodes, which makes it possible to increase their density and to obtain a better compensation of geometrical errors.

The two bridges are fed between voltages UP and UN. The signals received at the bridges' output are collected between the points S and S', respectively between the points C and C'. The signal received at the output CC' is phase-shifted by 90° with respect to the signal received at the output SS'. By using measuring bridges it is possible to compensate errors due for example to the spacing between the scale and the sensor and thus to achieve a measurement accuracy less than 10 μm, on the order of 5 μm, even with a simple guiding mechanism such as that found in a classical caliper of the aforementioned type.

The sensor 112 includes further at least one compensation resistance, not represented, whose value can be adjusted by laser during manufacture so as to balance said measuring bridge when no magnetic field is applied. This resistance enables the measuring bridges to be calibrated.

Figure 5:
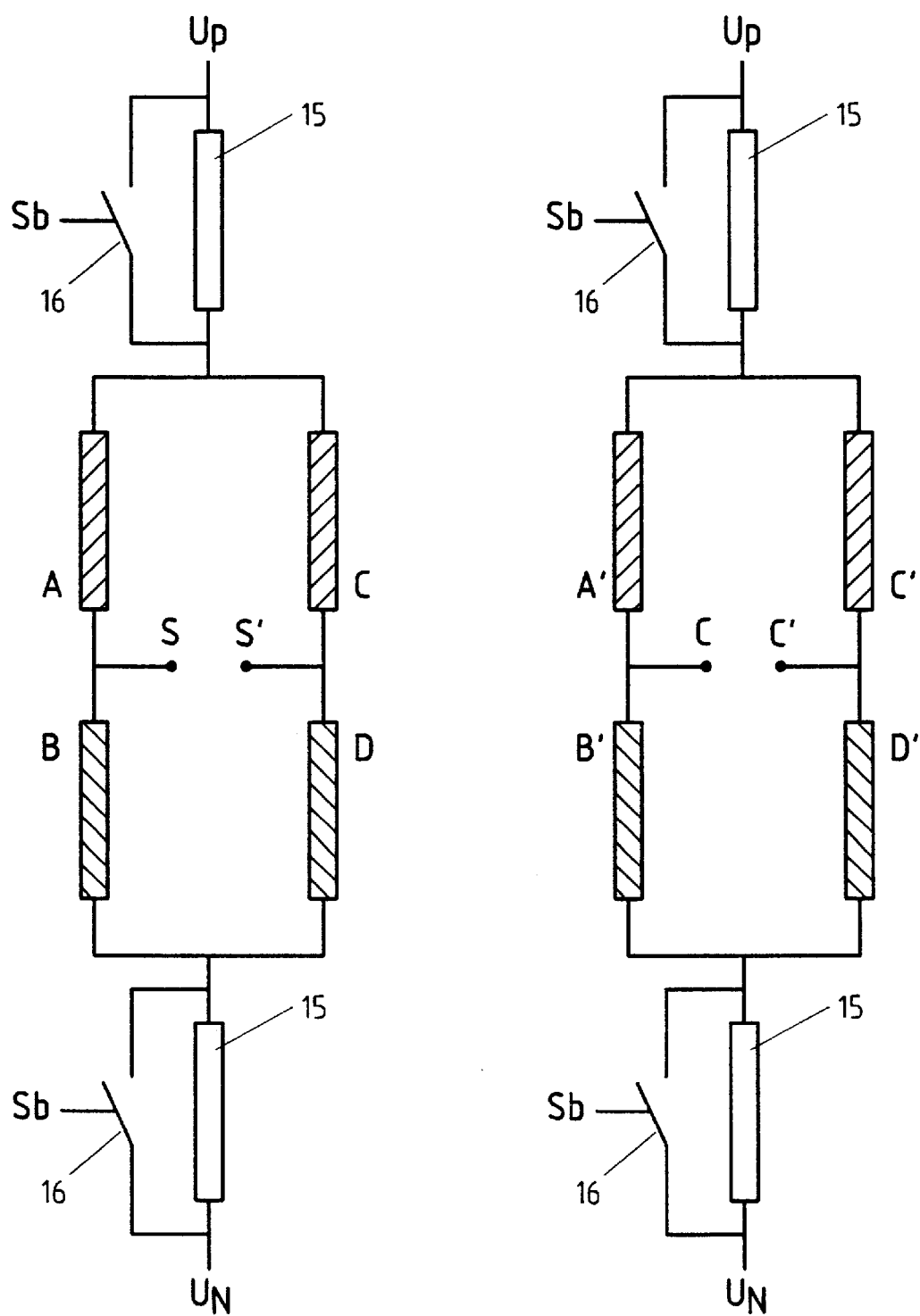
FIG. 5 shows an electric schema illustrating a second example of connection of the magnetoresistive electrodes so as to constitute measuring bridges.

FIG. 5 illustrates an alternative embodiment of the measuring bridges. In this alternative, the two bridges are powered between the voltages UP and UN through resistances 15. A switch 16, commanded by a stand-by signal sb, makes it possible to short-circuit every resistance 15 when the signal sb is inactive. This alternative enables the resistance between the points UP and UN to be increased when the measuring circuit is in stand-by mode, and thus to diminish the electricity consumption in this mode, at the expense of a lower amplitude of the measuring signal. Preferably the voltage applied in stand-by mode is sufficient for a movement of the slide to be detected, but insufficient for an accurate measurement.

When the circuit leaves the stand-by mode, for example periodically or further to a detection of movement, the switches 16 are closed so as to short-circuit the resistances 15 and apply the voltages UP and UN directly to the terminals of the measuring bridges.

In order to further reduce the electricity consumption, the voltage UP–UN can moreover be periodically decreased, for example under command of a clock, so as to effect measurements only intermittently.

Furthermore, the powering current injected in the primary amplifier of the measuring system (not represented) can be reduced in stand-by mode without necessarily reducing the benefits, so as to decrease the electricity consumption when no precise measurement is effected, at the expense of an increase of the noise.

In order to reduce even further the electricity consumption of the sensor, the electrode sets A to D' are preferably constituted by several magnetoresistive electrodes 1121 connected in series. The number of magnetoresistive electrodes per set is preferably greater than 4 but is constrained only by the size of chip 112; in an embodiment of the invention, the number of magnetoresistive electrodes per set is 72. The total number of magnetoresistive electrodes 1121 on sensor 112, in this non restrictive example with two measuring bridges constituted each of 4 sets of 72 electrodes, is thus 576. The resistance of each set and of each measuring bridge ABCD and A'B'C'D' between the points UP and UN can then be greater than 10 kΩ, preferable greater to 50 kΩ, which enables the caliper to be powered during several hours by a single lithium battery of limited volume.

The electrodes making up each set can occupy all identical phase positions, that is, positions at a distance of a period λ. In a first preferred embodiment, the electrodes of each set are spread so as to occupy close phase positions, for example positions spread between [kλ−w/2 and kλ+w/2] where k is a whole number and w a parameter indicating the spread of the electrodes of each set. In one example, w equals λ/4. A unit of contiguous electrodes from the same set and spaced by w is called a group and is indicated by reference 1120 in FIG. 3. With this configuration it is possible to achieve a resulting value of the resistances of the set of electrodes A to D' which averages the resistances of electrodes spread on an interval of width w. In a second preferred embodiment, which can be combined with the first, each set comprises electrodes phase-shifted by 180° but with barber-pole structures that have an opposite orientation.

In order to achieve optimal compensation of geometrical errors of the system, the electrodes 1121 of the magnetoresistive sensor 112 are spread on k periods λ, preferably on at least two periods λ, for example on 6 periods, the superior limit being determined only by the dimensions of chip 112.

The magnetic field H0 at the surface of the scale is preferably included in the interval of 10 to 100 kA/m and decreases exponentially to the distance a of the surface according to the ratio:

$$H_x(a) = H_0 \cdot e^{-2\pi a/\lambda}$$

For portable calipers, a distance a between the scale 21 and the magnetoresistive electrodes 1121 of less than 200 μm cannot be achieved without considerably increasing the cost of the device. The distance chosen should thus preferably be comprised between 200 μm and 700 μm, beyond which an increase of the distance a will no longer result in any important economic advantage. In an embodiment of the invention, the chosen distance a is thus 500 μm, that is, a value considerably greater than the customary performance of magnetoresistive sensors.

The above ratio shows that when the magnetic field $H_x(x)$ at a distance a of the scale increases rapidly with the scale's period λ, for a=λ/2, the magnetic field H(a) already represents only 4% of the value of the field H0 at the surface of the scale; it is therefore difficult to go beyond λ=2a, otherwise the resulting field is too weak for it to exert a sensible influence on the resistance of the magnetoresistive electrodes. The harmonics different from n=1 of $H_x(x, a)$ are however reduced if λ decreases, which ensures an increase of the accuracy. Trials have shown empirically that the optimal compromise is achieved with λ close to 2a, preferably with λ comprised between 1.6 and 2.2 a. Trials have shown that the required accuracy could be achieved for example with a value for λ of between 0.5 and 1.5 millimeters, preferably 1 millimeter.

What is claimed is:

1. A portable electronic precision caliper comprising:
   a shaft fitted with a magnetized scale having a period of magnetization λ,
   a slide that is displaceable longitudinally along said shaft, the slide and the shaft each having a jaw,
   an electronic circuit mounted on said slide and being powered by a source which is internal to said portable electronic precision caliper, said electronic circuit comprising a single sensor,
   said sensor comprising an array of n magnetoresistive electrodes disposed opposite said scale so that values of resistances of the magnetoresistive electrodes are a function of their longitudinal position along the scale, n being greater than two,
   said magnetoresistive electrodes being integrated in said sensor,
   said electronic circuit being able to determine, from the values of resistance of the magnetoresistive electrodes, information depending on a gap between said jaws and to display this information on said electronic display.

2. The caliper according to claim 1, wherein said array of magnetoresistive electrodes comprises a plurality of sets of magnetoresistive electrodes connected in series.

3. The caliper according to claim 2, wherein a number of magnetoresistive electrodes connected in series in each said set is greater than 8.

4. The caliper according to claim 3, wherein a thickness of the magnetoresistive electrodes is less than 100 nm, a length of the magnetoresistive electrodes is between 0.1 and 10 millimeters and a width of the magnetoresistive electrodes is less than 40 μm.

5. The caliper according to claim 4, wherein the dimensions of the magnetoresistive electrodes, their material and their number per set are chosen so that the resulting resistance of each said set of magnetoresistive electrodes is greater than 10 kΩ.

6. The caliper according to claim 5, wherein the dimensions of the magnetoresistive electrodes, their material and their number per set are chosen so that the resulting resistance of each said set of magnetoresistive electrodes is greater than 50 kΩ.

7. The caliper according to claim 3, wherein said magnetoresistive electrodes are spread longitudinally over at least two periods of magnetization λ of the scale.

8. The caliper according to claim 7, wherein said sets of magnetoresistive electrodes comprise electrodes occupying positions spread between kλ−w/2 and kλ+w/2,
   wherein k is a whole number and w is a parameter indicating the spread of electrodes of each set.

9. The caliper according to claim 2, wherein said sets of magnetoresistive electrodes connected in series are connected to define at least one measuring bridge, and wherein said electronic circuit uses a signal or signals at an output of said measuring bridge or bridges to determine a distance of said gap between said jaws.

10. The caliper according to claim 9, wherein a number of magnetoresistive electrodes per set is greater than 8.

11. The caliper according to claim 10, wherein a thickness of the magnetoresistive electrodes is less than 100 nm, a length greater than 0.1 mm and a width of the magnetoresistive electrodes is less than 40 μm.

12. The caliper according to claim 11, wherein the dimensions of the magnetoresistive electrodes, their material and their number per set are chosen so that the resulting resistance of each said set of magnetoresistive electrodes is greater than 10 kΩ.

13. The caliper according to claim 12, wherein the dimensions of the magnetoresistive electrodes, their material and their number per set are chosen so that the resulting resistance of each said set of magnetoresistive electrodes is greater than 50 kΩ.

14. The caliper according to claim 8, wherein said sets of electrodes connected in series are connected to define two measuring bridges, and wherein said electronic circuit uses signals at an output of said measuring bridges to determine a distance of said gap between said jaws.

15. The caliper according to claim 14 wherein a voltage applied to said measuring bridges is reduced when said caliper is in a stand-by mode.

16. The caliper according to claim 15, wherein the voltage applied to said measuring bridges in said stand-by mode is sufficient for detecting a displacement of the slide.

17. The caliper according to claim 14, wherein the magnetoresistive electrodes constituting the second measuring bridge are phase-shifted by λ/4 with respect to the magnetoresistive electrodes making up the first measuring bridge, so that signals at the two bridges' outputs are phase-shifted by 90° with respect to each other.

18. The caliper according to claim 17, wherein said magnetoresistive electrodes are spread longitudinally so as to constitute x groups of magnetoresistive electrodes, said groups being spaced by λ/4 and comprising at least two magnetoresistive electrodes of a same set connected in series.

19. The caliper according to claim 1, wherein a distance between the magnetized scale and the magnetoresistive electrodes is between 0.2 and 0.7 millimeters, and wherein the period of said scale is between 0.5 and 1.5 millimeters.

20. The caliper according to claim 19, wherein said magnetoresistive electrodes are spread longitudinally over at least two periods of magnetization λ of the scale.

21. The caliper according to claim 20, wherein said magnetoresistive electrodes are spread longitudinally over at least 3 millimeters.

22. The caliper according claim 1, wherein at least certain magnetoresistive electrodes are provided with barber-pole structures.

23. The caliper according claim 22, wherein said magnetoresistive electrodes are provided with barber-pole structures with several different orientations.

24. The caliper according to claim 9, wherein said sensor further comprises at least one compensation resistance of said measuring bridge or bridges, whose value is adjustable by a laser during manufacture so as to balance said measuring bridge when no magnetic field is applied.

25. The caliper according to claim 1 wherein said electronic circuit is arranged on a printed circuit board, and wherein said magnetoresistive sensor is disposed on a side of the printed circuit opposite said scale.

26. The caliper according to claim 25, wherein said electronic circuit includes a permanent magnet mounted on the side of the printed circuit board opposite the scale, close to said magnetoresistive electrodes, so as to modify a direction and amplitude of a magnetic field resulting on said magnetoresistive electrodes.

27. The caliper according claim 26, wherein said magnetoresistive sensor is coated with a synthetic protective layer opposite said scale.

28. The caliper according to claim 26, wherein said slide is of metal, wherein said printed circuit board is affixed directly on said slide so that the magnetoresistive electrodes of said magnetoresistive sensor are at a predetermined distance of the scale, wherein the slide is further provided with a shockproof coating of synthetic material over said printed circuit, an opening being provided through said shockproof coating for fitting said electronic display.

29. The caliper according to claim 1, wherein said electronic circuit further comprises an accumulator and a linear generator, a displacement of said slide along said magnetized scale generating a current in said linear generator, said current recharging said accumulator, and said accumulator powering said electronic circuit.

30. The caliper according to claim 1, wherein said shaft and said slide are of aluminum whereas said scale is of steel.

31. The caliper according to claim 30, wherein said scale is coated with a non-magnetic protective layer.

32. The caliper according to claim 31, wherein said protective layer bears markings indicating at least approximately the position of the slide along the shaft.

33. A portable electronic precision caliper, comprising:
- a shaft fitted with a magnetized scale having a period of magnetization $\lambda$,
- a slide that is displaceable longitudinally along said shaft, the slide and the shaft each having a jaw,
- an electronic circuit mounted on said slide and being powered with an internal power source, said electronic circuit comprising a single sensor,
- said sensor comprising an array of n magnetoresistive electrodes disposed opposite said scale so that values of resistances of the magnetoresistive electrodes are a function of their longitudinal position along the scale, n being greater than two,
- said electronic circuit being able to determine, from the values of resistance of the magnetoresistive electrodes, information depending on a gap between said jaws and to display this information on said electronic display,
- said array of magnetoresistive electrodes consisting of a plurality of sets of magnetoresistive electrodes each comprising at least 8 electrodes connected in series, a thickness of the nagnetoresistive electrodes being less than 100 nm, a length of said magnetoresistive electrodes being between 0.1 and 10 millimeters and a width of said magnetoresistive electrodes being less than 40 $\mu$m, so that a resulting resistance of each set of magnetoresistive electrodes is greater than 10 k$\Omega$, so that said caliper can be powered with an internal power source.

34. The caliper according to claim 33, wherein said magnetoresistive electrodes are spread over at least two periods of magnetization $\lambda$ of the scale,
- wherein the resulting resistance of each set of magnetoresistive electrodes is greater than 50 k$\Omega$, said electronic circuit using signals at an output of said measuring bridges to determine a distance between said jaws,
- said sets of magnetoresistive electrodes connected in series being connected to define two measuring bridges to determine the distance between said jaws.

35. The caliper according to claim 34, wherein the magnetoresistive electrodes constituting the second measuring bridge are phase-shifted by $\lambda/4$ with respect to the magnetoresistive electrodes making up the first measuring bridge,
- wherein said magnetoresistive electrodes are spread longitudinally so as to constitute x groups of magnetoresistive electrodes, said groups being spaced by $\lambda/4$ and comprising at least two magnetoresistive electrodes of a same set and connected in series,
- so that the signals at the two bridges' output are phase-shifted by $\lambda/4$.

36. The caliper according to claim 33, wherein a distance between the magnetized scale and the magnetoresistive electrodes is between 0.2 and 0.7 millimeters,
- the period of magnetization $\lambda$ of the scale being between 0.5 and 1.5 millimeters,
- said magnetoresistive electrodes being spread longitudinally over a length greater than or equal to two periods of magnetization $\lambda$ of the scale and greater than or equal to 3 millimeters.

37. The caliper according to claim 33, wherein at least certain magnetoresistive electrodes are provided with barber-pole structures with several different orientations.

* * * * *